United States Patent [19]

Edwards et al.

[11] Patent Number: 4,851,900
[45] Date of Patent: Jul. 25, 1989

[54] IMAGING SYSTEM EMPLOYING AN ELECTRONIC VARIABLE COLOR FILTER

[75] Inventors: Clarence C. Edwards, 1220 Edgevale Rd., Silver Spring, Md. 20910; Clarence C. Edwards, Jr., Silver Spring, Md.

[73] Assignee: Clarence C. Edwards, Silver Spring, Md.

[21] Appl. No.: 99,530

[22] Filed: Sep. 17, 1987

[51] Int. Cl.[4] .............................................. H04N 9/43
[52] U.S. Cl. ......................................... 358/81; 358/93
[58] Field of Search ...................... 358/81, 82, 181, 93, 358/107

[56] References Cited

U.S. PATENT DOCUMENTS

| | | | |
|---|---|---|---|
| 3,975,762 | 8/1976 | Van Den Bosch | 358/81 |
| 4,025,946 | 5/1977 | Casey | 358/81 |
| 4,606,625 | 8/1986 | Geshwind | 358/81 |

*Primary Examiner*—Tommy P. Chin
*Attorney, Agent, or Firm*—Mason, Fenwick & Lawrence

[57] ABSTRACT

An electronic filter system for electronically placing a filter on the screen of a video display monitor. A video signal after prescribed processing is fed into an arrangement of four switches. The first switch is operatively connected to three transistors, and through the second, third and fourth switches, to three potentiometers. When the various transistors conduct, they each produce an output signal that is fed to the input of a conventional color video display monitor having three primary color guns. The signals from the three transistors are fed to each of the primary color guns in order to produce varying images on the display monitor. The second, third and fourth switches provide a convenient way for selectively controlling the activation of the green, red and blue guns of the display monitor. Several different sources of video signals for introduction into the inventive circuitry are contemplated. Examples of sources are an ultrasound apparatus, a video microscope camera, and a system for converting an X-ray image into a video signal.

9 Claims, 3 Drawing Sheets

IMAGING SYSTEM EMPLOYING AN ELECTRONIC VARIABLE COLOR FILTER

FIELD OF THE INVENTION

The present invention relates to video color imaging system, in general, and to diagnostic imaging systems employing selective color image filtering, in particular.

BACKGROUND OF THE INVENTION

In the field of medical technology, the cathode ray tube (CRT) display has become an indispensible item as a vehicle for visually presenting the results of both real time and previously conducted activities in such fields as microscopy, X-ray analysis, magnetic resonance imaging, digital subtraction angiography, radio isotope imaging, computed tomography, nuclear medicine and sonography, to name a few. In each case, use is made of a video signal derived from an array of sensors specifically designed to detect certain physiological aspects of the human body.

Video imaging systems are also used in other fields of analysis such as surveillance, radar scopes, aerial photo interpretation, ultrasound diagnosis, stress analysis, nuclear magnetic resonance, fingerprint analysis, to name a few. In all of these fields, the CRT display typically takes the form of a monochrome display that reproduces images in what is commonly known as black-and-white or monochrome mode. In situations where a color monitor is employed, color is introduced as a means of distinguishing between contrasting features found in the displayed image. In certain prior art devices, color is introduced through pre-processing circuitry which detects the variable intensity of the features of an image as monitored by a sensor and then assigns a color to that feature based on the recorded intensity. The assigned color is selected by the manufacturer and the user has no ability to alter that color because the diagnostic technique developed around the machine requires that certain colors be reproduced.

There is thus a need for an imaging system which is capable of reproducing both the conventional black-and-white images as well as the color images and, at the same time, provide the user with the ability to selectively introduce color elements into the normally monochrome image provided by either the monochrome or composite video signal derived from the prior art machines.

SUMMARY OF THE INVENTION

The present invention provides a way to, in effect, electronically place a filter on the screen of a video display monitor. In much the same way as a mechanical filter is placed in front of or behind the lens of a camera in order to change the color of an image, the electronic filter system of the present invention, accomplishes the same result through electronic control.

In medical applications, images produced on video displays are usually presented in shades of gray or light blue. Oscilloscopes and film are customarily used to record the images. As an alternative, the images may be stored in digital form in a computer for quick and convenient recall. One of the major advantages of the present invention is to allow the images which normally appear in gray or blue to be electronically filtered, thus allowing the image to be reproduced in an endless variety of colors for best examination.

In a preferred embodiment of the present invention, a video signal after conventional pre-processing is fed into the input of a demodulator in order to recover the modulating wave from the modulated carrier. Also, forming part of the electronic filtering system are four switches. The first switch consists of a three-gang, single-pole, double-throw switch, whereas the second, third and fourth switches each consist of a single-pole, double-throw switch. The first switch is operatively connected to three transistors and through the second, third and fourth switches, to three potentiometers.

When the various transistors conduct, they each produce an output signal that is fed to the input of a conventional color video display monitor. The signals from the three transistors are fed to each of the three primary color guns in order to produce varying images on the display monitor.

With the first switch in a first position, the signals from the demodulator are fed to the bases of the three transistors. The signals cause the transistors to selectively conduct and produce output signals on the collectors which are fed to conventional processing circuits found in the display monitor. These circuits alter the signals to place them in a form suitable for activating the three color guns of the display monitor.

If the first switch is placed in its alternative position, the signals from the demodulator are routed through the three potentiometers. Through the selective use of the second, third and fourth switches, the signals introduced into the potentiometers eventually pass the bases of the three transistors. In the alternative, the video signals may pass through the center taps of the potentiometers and then to the bases of the transistors. Thus, the second, third and fourth switches provide a convenient way for selectively controlling the activation of the green, red and blue guns of the display monitor. Another feature of the electronic filtering system is the provision of a biasing circuit which is made up of a resistive network including a potentiometer. Through the adjustment of potentiometer, the user has the ability to control the mixture of any two or three of the primary colors.

The present invention contemplates several different sources of video signals for introduction into the inventive circuitry. In one embodiment, the video output signal may be derived from a conventional ultrasound apparatus. In an alternative embodiment, the image created by the illumination of a specimen is passed through a microscope camera interface and into the lens of a video camera. The video output signal is a composite signal made up of monochrome, red, green and blue video sub-signals. In still another embodiment, a system for converting an X-ray image into a video signal is provided. The invention has also been incorporated into a microscopy teaching system for use in a classroom setting.

DETAILED DESCRIPTION OF THE PREFERRED EMBODIMENTS

Figure 1:
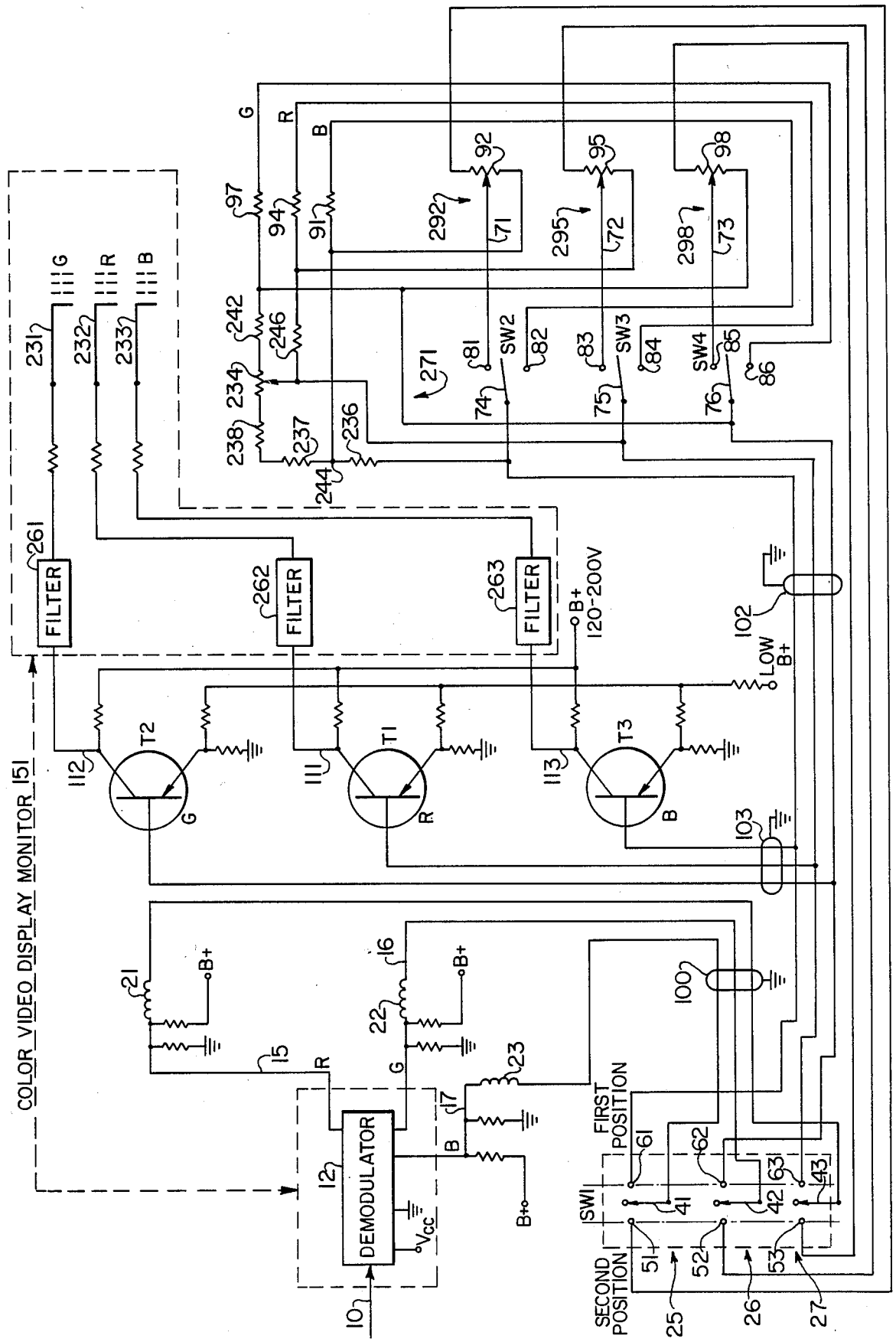
FIG. 1 is a schematic diagram showing the circuitry of a preferred embodiment of the subject invention associated with a conventional color video display monitor.

FIG. 1 is a schematic diagram of a circuit embodying the teachings of the present invention. A video signal after conventional pre-processing is fed on line 10 into the input into a demodulator 12 in order to recover the modulating wave from the modulated carrier. The demodulator 12 has three output signals appearing on lines 15 through 17. Each of the signals, in turn, passes through an inductor 21–23. Also forming part of the electronic filtering system are four switches SW1 through SW4. Switch SW1 consists of a three-gang, single-pole, double-throw switch, whereas switches SW2 through SW4 each consist of a single-pole, double-throw switch. Switch SW1 is divided into three sections 25 through 27.

The signal on line 15 is fed into the center tap 43 of switch section 27. The signal on line 16 is fed to the center tap 42 of switch section 26. Finally, the signal on line 17 is fed to the center tap 41 of switch section 25. One pole 63 of switch section 27 is fed to the base of a PNP transistor T1. One pole 62 of switch section 26 is fed to the base of PNP transistor T2. Finally, one pole 61 of switch section 25 is fed to the base of PNP transistor T3.

At the same time, pole 63 of switch section 27 is connected to the center tap 75 of switch SW3. In like manner, pole 62 of switch section 26 is connected to center tap 76 of switch SW4 and pole 61 of switch section 25 is connected to the center tap 74 of switch SW2.

One pole 81 of switch SW2 is connected to the center tap 71 of a variable, resistor or potentiometer 292. In like manner, pole 83 of switch SW3 is connected to the center tap 72 of potentiometer 295 and pole 85 of switch SW4 is connected to the center tap 73 of potentiometer 298.

One end of resistor 92 of potentiometer 292 is connected through resistor 91 to one pole 82 of switch SW2. The other side of resistor 92 of potentiometer 292 is connected to the other pole 51 of switch section 25. In like manner, one side of resister 95 of potentiometer 295 is connected through resistor 94 to pole 84 of switch SW3. The other side of resistor 95 of potentiometer 295 is connected to the other pole 52 of switch section 26. Finally, one side of resister 98 of potentiometer 298 is connected through resistor 97 to pole 86 of switch SW4. The other side of resistor 98 of potentiometer 298 is connected to the other pole 53 of switch section 27.

As noted in the drawing, all of the lines between switch SW1 and switches SW2 through SW4 are shielded in a conventional manner through the use of a shielded cable, the shielding being denoted generally by reference numeral 102. By the same token, the lines from the center tap of the various switch sections constituting switch SW1 to the demodulator are shielded through the use of a shielded cable with the shielding being generally denoted by reference numeral 100. Finally, the lines from switches SW1 through SW4 to the bases of transistors T1 through T3 are shielded by cable 103.

When the various transistors T1 through T3 conduct, they each produce an output signal on lines 111 through 113, respectively. These lines are then fed to the input of an conventional color video display monitor 151. In the manner to be described hereinafter, these lines provide the signals to each of the three primary color guns 231 through 233 in order to produce varying images on the display monitor.

Center tap 74 of switch SW2 is connected through serial resistors 236 through 238 to one side of the resistor of potentiometer 234. In turn, center tap 75 of switch SW3 is connected to the center tap potentiometer 234 and center tap 76 of switch SW4 is connected to the other side of the resistor of potentiometer 234 via series resistor 242. The common node 244 of resistors 236 and 237 is connected to one side of resistor 91. The center tap of potentiometer 234 is connected to one side resistor 94 through resistor 246.

In operation, a video signal, which may be either a monochrome signal or a composite signal, passes through preprocessing circuitry and eventually into demodulator 12 in order to recover the modulating wave from the modulated carrier. In a preferred embodiment, the demodulator forms part of the circuitry found in the video display monitor 151. The demodulator outputs three signals on lines 15 through 17. The signal on line 15 represents the video signal eventually used to activate the red gun 232 of the display monitor 151. In turn, the signal on line 16 represents the video signal for activating the green gun 231 and the signal on line 17 represents the video signal for activating the blue gun 233.

The active signals on lines 15 through 17 pass through inductors 21 through 23, respectively, and then to the center taps 41 through 43 of switch SW1. With switch SW1 in a first position, the signals on lines 15 through 17 are fed to the bases of transistors T1 through T3. The signals cause the transistors to selectively conduct and produce output signals on collectors 111 through 113 which are fed to filter circuits 261 through 263 found in the conventional monitor 151. These circuits alter the signals appearing on lines 111 through 113 to place them in a form suitable for activating the three color guns 231 through 233.

If switch SW1 is placed in its alternative or second position, the signals on lines 15 through 17 are routed through potentiometers 292, 295 and 298, respectively. Through the selective use switches SW2 through SW4, the signals introduced into the potentiometers may pass through a fixed resistor, such as resistors 91, 94 and 97, and then to the bases of transistors T1 through T3. In the alternative, the video signals may pass through the center taps 71 through 73 of the potentiometers and then to the bases of transistors T1 through T3. Thus, switches SW2 through SW4 provide a convenient way for selectively controlling the activation of the green, red and blue guns of the display monitor 151 and thus accomplish an electronic filtering function. By way of example and with the understanding that the following explanation applies to all of the switches SW2 through SW4, when switch SW2 is placed in a first position so that the center taps 74 is in contact with pole 82, the blue video signal passes through potentiometer 292 and resistor 91 through switch SW2 and then to the base of transistor T3. This signal controls transistor T3 to produce an output signal on line 113 which in turn is fed through conventional circuitry 263 for activation of the blue gun 233.

When switch SW2 is placed in the alternative or second. position where the center tap 74 is in contact with pole 81, the video signal through the potentiometer 292 is fed through the center tap 71 through switch SW2 and then to the base of transistor T3. As can be appreciated, by adjusting potentiometer 292, the intensity and color content of the video signal may be altered with the result that the activation of the color gun 233 is selectively controlled.

Another feature of the electronic filtering system is the provision of a biasing circuit 271 which is made up of resistors 236 through 238, 234, 242 and 246, connected in the manner previously described. Through the adjustment of potentiometer 234, the user has the ability to control the intensity and thus the mixture of any two or three of the primary colors.

Figure 2:
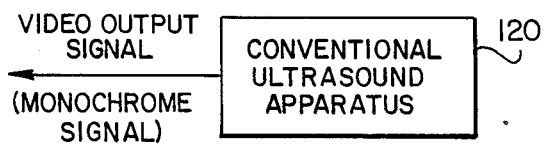
FIG. 2 is a schematic diagram showing the source of a video output signal for use by the circuitry of FIG. 1.
Figure 3:
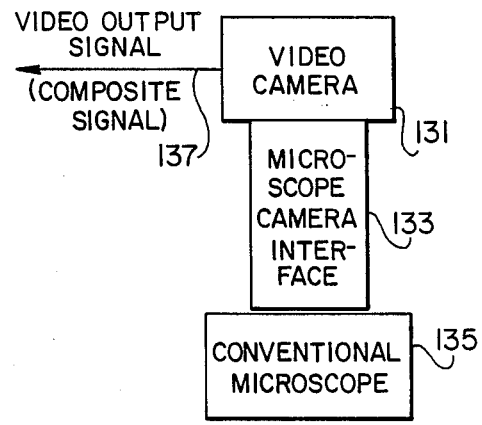
FIG. 3 is a schematic diagram showing the source of a video output signal for use by the circuitry of FIG. 1.

FIGS. 2 through 5 schematically illustrate several different sources of video signals for introduction into the inventive circuitry. FIG. 2 illustrates that the video output signal as being derived from a conventional ultrasound apparatus. In this case, the video signal would be of the black-and-white-type made up of only a monochrome video signal. FIG. 3 shows a conventional video camera 131 connected to a conventional microscope 135 through a conventional microscope-camera interface 133. The microscope includes a specimen holding area which is illuminated by a light source (see FIG. 6). The image created by the illumination of the specimen is passed through the microscope camera interface and into the lens of the video camera. The video camera then produces a video output signal on line 137. The signal is representative of the image of the specimen. In a preferred embodiment, the video output signal on line 137 is a composite signal made up of either a monochrome or a composite of red, green and blue video sub-signals.

Figure 4:
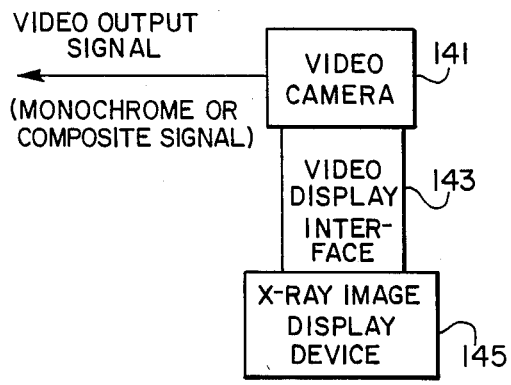
FIG. 4 is a schematic diagram showing the source of a video output signal for use by the circuitry of FIG. 1.

FIG. 4 schematically illustrates a system for converting an X-ray image into a video signal. Basically, the system comprises a conventional X-ray image display device 145 that consists of an illuminated plane or surface on which an X-ray film may be exhibited for viewing (see FIG. 7). A conventional video camera 141 is operatively associated with the display device to capture the image of an X-ray film as it is displayed on the illuminated surface. A conventional video/display interface 143 is employed to insure that the lens of the video camera is properly aligned relative to the display area of the X-ray image display device. The output of the video camera appears on line 147 and constitutes a video signal representing the X-ray film being displayed on the illuminated surface of the X-ray image display device. Depending on the nature of the video camera, the video signal appearing on line 147 may be either monochrome or composite.

Figure 5:
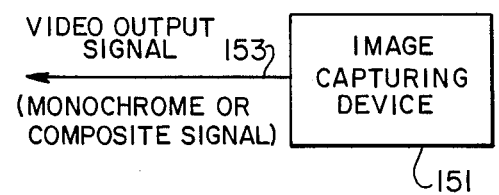
FIG. 5 is a schematic diagram showing the source of a video output signal for use by the circuitry of FIG. 1.

Finally, FIG. 5 schematically illustrates a generalized image capturing device 151 which produces a video output signal 153 either of the monochrome of composite variety. The image capturing device may be any of the well-known devices used to view or sense the characteristic of an object and to convert that viewing or sensing into a video representation for display on a CRT monitor.

As has already been explained in detail hereinbefore, in using a preferred embodiment of the invention, a video signal either of the monochrome or composite variety after pre-processing in a conventional manner is fed into demodulator 12 on line 10. The demodulator reorganizes the incoming signal so as to produce an output signal for use in activating the three color guns 231 through 233 (green, red and blue) of a conventional color video display monitor 151.

Figure 6:
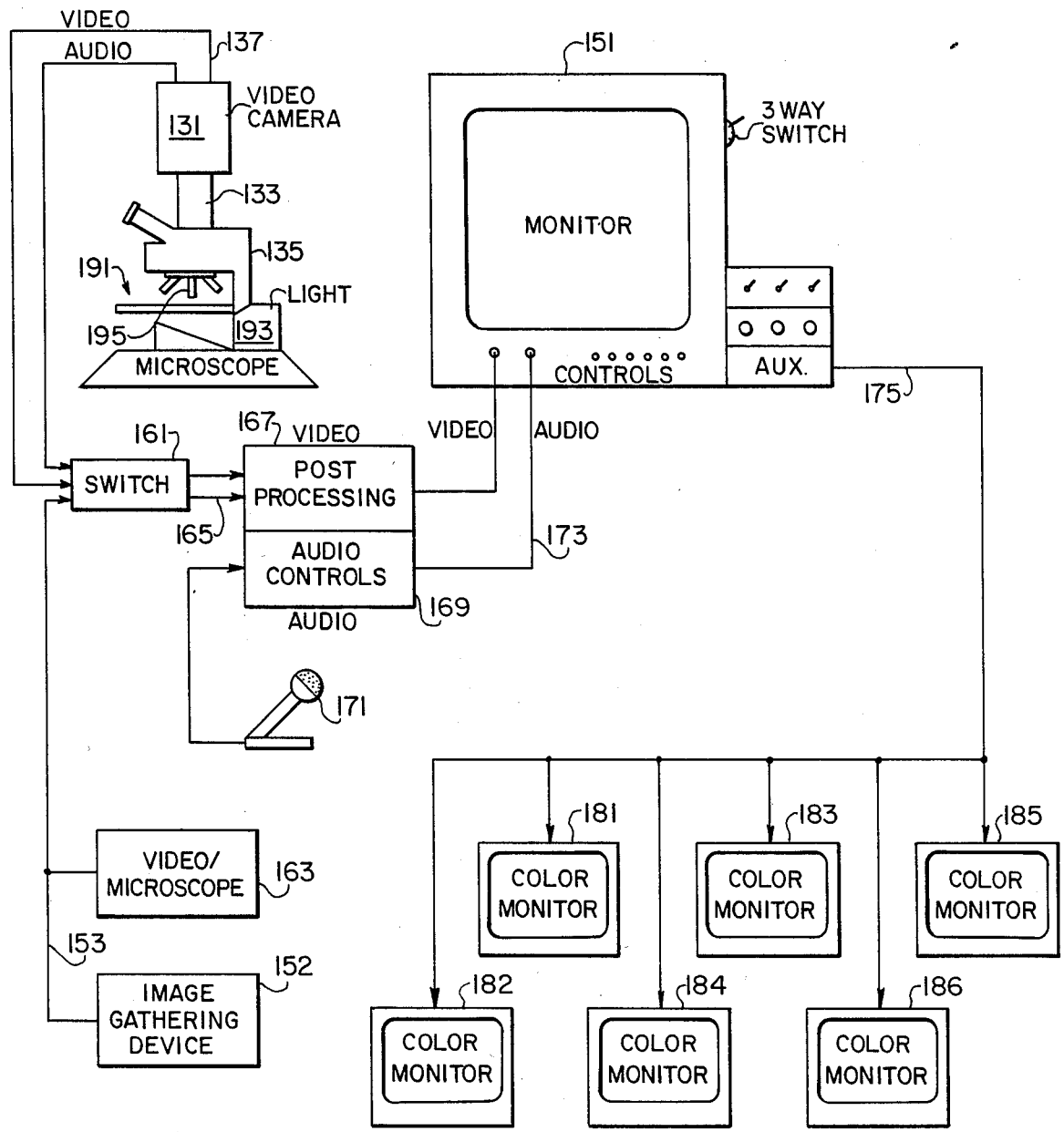
FIG. 6 is a functional block diagram partially in schematic form to illustrate the application of the present invention in the field of microscopy.

In the embodiment illustrated in FIG. 6, the invention has been incorporated into a microscopy teaching system for use in a classroom setting. Basically, the system comprises a microscope 135 which is connected to a video camera 131 through interface 133. The video signal from the video camera is fed to a switch 161 which has a number of inputs for receiving additional video signals from another microscope 163 or from another image capturing device 151 including any of the devices shown in FIGS. 2 through 5. Thus, it is to be understood that any of the type of video signals previously described may be fed into the switch 161. Switch 161 may be either a mechanical switch capable for selecting one of the many incoming video signals as an output video signal on line 165. It is also contemplated that the switch may be implemented through transistor or integrated circuit logic. The output video signal from switch 161 is fed to a conventional video post processor 167 where the signal may be altered by applying any of the well known post-processing techniques.

A microphone 171 is associated with the user of the microscope in order to provide an audio track to accompany the video image. The output of the microphone is fed to a conventional audio control in order to produce an output signal on line 173. The video output of the post-processor 167 and the audio output of the audio control are fed to the appropriate inputs of the conventional video display monitor 151. Incorporated within the circuitry of the monitor 151 is the RGB controls and switches as previously described with reference to FIG. 1. At the same time, the signal used to drive the internal circuitry of the monitor 151 in order to produce the various color images is also fed on shielded lines 175 to an array of video display monitors 181 through 186. In this way, the image and sound produced on monitor 151 is also reproduced at remote locations 181 through 186.

In use, a lecturer inserts a specimen in the specimen holding area 191 of the microscope 135. A light source 193 illuminates the specimen and this illuminated image is passed through one of the lenses 195 of the microscope so that the image is received by the lens of the video camera 131. At the same time, the lecturer may add an audio description through the use of the microphone 171. After the video and audio signals have been fed to the monitor 151, the lecturer is then able to adjust the RGB switches and the RGB color controls in order to alter the result and image on the video display monitor in accordance with the teachings of the present invention as previously described.

In using the electronic color filtering system in the field of microscopy, the three principal items necessary for proper utilization are a camera properly fitted and adjusted to optimal resolution, a microscope capable of working with stain slides, wet mounts, phase contrast, dark field, etc., and a specimen which is properly suited to light microscopy. The results obtained under fluorescence microscopy are greatly enhanced by the present invention.

The microscope provides for light management including type, intensity, filtration, gathering, condensation, aperture, polarization, interference, phase contrast, dark field, specimen transmission, specimen movement and the actual process of magnification. In this way, live specimens can be examined without damaging the specimen.

For best results, after a specimen has been placed on the specimen holding area of the microscope and the illumination has been turned on, the specimen is placed under the 10× objective lens and brought into focus. After the image appears on the video display monitor, the quality of the image being displayed may be set through adjustment of the various controls. Usually, the adjustment is done in either the by-pass or black-and-white modes of operation of the electronic color filtering system. The most useful controls are magnification, light, contrast, dimensions, filtering, field selection, focus, measuring and pointers. The controls which adjust image quality in a video camera are usually automatic and the user need not be concerned with them unless he wishes to either override the camera or reverse the image. Finally, the controls on the monitor, which typically consists of horizontal centering, vertical hold, contrast, brightness, color and tint are adjusted. However, the color and tint controls need not be altered to practice the invention.

Once the field to be examined is selected and the proper microscope adjustment has been made, the monitor will show a field in the color selected through the electronic filter circuitry. Inverse or reverse image viewing capabilities allow negative viewing which can be extremely useful in many situations.

Generally, noise is not a problem with microscope video output, since the source is a video camera used for acquisition. There are some techniques which are useful once the image is acquired and focused. Among the most useful are polarity reversal, contour generation, comparator with signal enhancement, intensity control, fading, contrast control and filtering. These techniques allow use of lower resolution monitors because high resolution monitors are not always cost effective.

Figure 7:
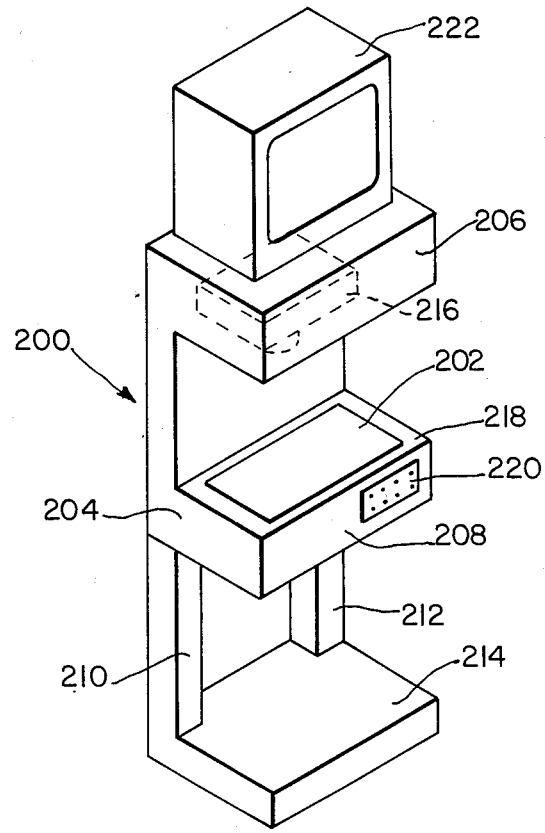
FIG. 7 is a perspective view of a display apparatus incorporating the teachings of the present invention.

FIG. 7 shows yet another embodiment of a device incorporating the teachings of the subject invention. The imaging device generally designated as 200 is used principally for creating a video display of an X-ray film 202 (any transparency can be viewed). The device 200 basically comprises a housing 204 containing an upper compartment 206 and a lower compartment 208. The lower compartment is supported by a pair of legs 210 and 212 on a pedestal 214. Positioned within compartment 206 is a video camera 216 (shown in phantom). A top face 218 of lower compartment 208 is made of a translucent planar material such as glass. Positioned within compartment 208 is a light source (not shown) for illuminating the plane or glass surface.

The front surface of compartment of 208 includes a control panel 220 which contains the appropriate controls for adjusting the intensity of the illumination, for controlling the video camera and for controlling a video display monitor 222 positioned atop compartment 206.

In use, an operator is able to place an X-ray film 202 over the plane or glass 218. By adjusting the illumination from the light source, the operator is able to create an image that is captured by the lens of the video camera 216 and then fed to the monitor 222 after passing through circuitry similar to that shown in FIG. 1. In this way, the operator is able to adjust the intensity of the image created on the display and also to selectively introduce the electronic filter circuitry into the video signal in order to alter the displayed image in accordance with the teachings of the present invention.

As can be seen, the present invention provides a way to, in effect, electronically place a filter on the screen of a video display monitor. In much the same way as a mechanical filter is placed in front of or behind the lens of a camera in order to change the color of an image, the electronic filter system of the present invention, accomplishes the same result through electronic control. The system thus allows many useful post production techniques.

In medical applications, images produced on video displays are usually presented in shades of gray or light blue. Images of any color combination can be used with the present invention.

Oscilloscopes and film are customarily used to record the images. As an alternative, the images may be stored in digital form in a computer for quick and convenient recall. One of the major advantages of the present invention is to allow the images which normally appear in gray or blue to be electronically filtered, thus allowing the image to be reproduced in an endless variety of colors for best examination. Among the operator controls most important to proper operation of the electronic color filter system are intensity control, comparator control, image enhancing, fade control, noise reduction, contrast and rapid reversing between a filtered image and an unaltered video signal.

When all three of the switches for controlling the red, green and blue are in the off position, a dull green color of low intensity exists on the video display. This color has been found to be very useful as a background color when the brightness is properly adjusted. By adjusting the three primary color controls 292, 295 and 298 with the primary color switches off, it is possible to vary the background from a dull green to a medium red. This feature extends the range of all monitor controls as well as post-production controls. For example, it is possible to enhance contrast and experience a wider range of brightness. This favorably affects contouring.

It is contemplated that the invention may have additional applications outside of medicine. The present invention may be applied to home entertainment where it is desirable to manipulate background colors in order to tailor or change the appearance of anything that comes over the airwaves.

The invention may be used for surveillance. Cameras used in this field are usually black-and-white. The person who is monitoring a scene can change the background colors in order to either get a better view or enhance a night view so that the scene can be better defined. The proper use of this technique will improve night vision.

Often radar scopes have a green background with brighter green blips that represent various aircraft that are within the proximity of an airport. The capability to alter this monochrome by the present invention will help to alleviate fatigue by allowing the radar operator to vary the background colors in order to avoid the fatigue and errors encountered by constantly looking at tones or shades of green, orange, red or whatever the case may be.

The present invention is capable of enhancing aerial photos or any kind of photo by changing to background colors selectively for the best form of analysis, thus enabling any trained analyst of photos to greatly increase the chance of seeing all that is in the picture through utilization of the entire gamut of colors available.

The present invention can also be used in stress analysis and fatigue of structural components. The source of such being ultrasound, X-ray or pictures that have been taken of either stressed or fatigued parts using all the present modalities employed to acquire such information:

The present invention, when applied at computer user terminals, would help to alleviate eye fatigue if the user can change the background color of the CRT. This will prevent burn-in of the retina when users are exposed to one color for sustained periods of time, which can result in possibly eventual damage to the retina.

Finally, the invention may be employed to improve the use of "black box" and modified monitor viewing of fingerprints on a color CRT. It is well-known that fingerprint identification can be done by computer, yet someone must look at either the computers match or a possible series of matches that are similar. The differentiation is perceived by an expert as well as the computer. The ability to vary the background colors of the fingerprints will give the expert excellent leverage when making a decision, knowing that he or she has utilized all the available means to match prints with people.

Many changes and modifications in the above embodiments of the invention can be made without departing from the scope of the invention. Accordingly, the scope is intended to be limited only by the appended claims.

What is claimed is:

1. A diagnostic and analytic imaging system comprising:
    video means for providing a composite video signal representative of an image to be analyzed, said composite video signal including either monochrome or a composite of red, green and blue video information;
    means for converting said composite video signal into red, blue and green gun-control signals;
    color display means including red, blue and green color guns for displaying said image to be analyzed in eye-readable form, said red, blue and green color guns being activated by said red, blue and green gun-control signals, respectively;
    control means selectively operable in first and second modes, said control means in said first mode for selectively passing one of said gun-control signals to one of said color guns in said color display means, and said control means in said second mode for passing all of said gun-control signals, respectively, to the color guns of said display means; and
    means for changing the intensity of each of said gun-control signals that is passed to said color display means.

2. The imaging system of claim 1, wherein said video means comprises:
    a microscope including a specimen holding area and a light source for illuminating the specimen holding area;
    imaging means for providing said composite video signal representative of an image of a specimen to be analyzed; and
    means for interfacing said microscope with said imaging means so that the specimen placed in said specimen holding area is converted into said composite video signal in said imaging means.

3. The imaging system of claim 1, wherein said video means comprises:
    an X-ray display device including an X-ray film holding area and a light source for illuminating the X-ray film holding area;
    imaging means for providing said composite video signal representative of an X-ray film to be analyzed; and
    means for interfacing said X-ray film with said imaging means so that the X-ray film placed in said X-ray film holding area is converted into said composite video signal in said imaging means.

4. A microscopy imaging system comprising: a microscope including a specimen holding area and a light source for illuminating the specimen holding area;
    imaging means for providing a composite video signal representative of an image of a specimen to be analyzed, said composite video signal including either monochrome or a composite of red, green and blue video information;
    means for converting said composite video signal into red, blue and green gun-control signals;
    means for interfacing said microscope with said imaging means so that said image of the specimen placed in said specimen holding area is converted into said composite video signal in said imaging means;
    color display means including red, blue and green color guns for displaying said image of the specimen to be analyzed in eye-readable form, said red, blue and green color guns being activated by said red, blue and green gun-control signals, respectively;
    control means selectively operable in first and second modes, said control means in said first mode for selectively passing one of said gun-control signals to one of said color guns of said color display means, and said control means in said second mode for passing all of said gun-control signals respectively to the color guns of said display means; and
    means for changing the intensity of said gun-control displayed on said color display means.

5. A microscopy imaging system comprising:
    a microscope including a specimen holding area and a light source for illuminating the specimen holding area;
    imaging means for providing a composite video signal representative of an image of a specimen to be analyzed, said video signal including either monochrome or a composite of red, green and blue information;
    means for converting said composite video signal into red, blue and green gun-control signals;
    means for interfacing said microscope with said imaging means so that said image of the specimen placed in said specimen holding area is converted into said composite video signal in said imaging means;
    a plurality of color display devices each including red, blue and green color guns for displaying said image to be analyzed in eye-readable form, said red, blue and green color guns in each color display device being activated by said red, blue and green gun-control signals, respectively;
    control means selectively operable in first and second modes, said control means in said first mode for selectively passing one of said gun-control signals to one of said color guns in each of said color display devices, and said control means in said second mode for passing all of said gun-control signals respectively to the color guns of each of said color display devices; and means for changing the intensity of said image displayed on each of said display devices.

6. The imaging system of claim 4, further comprising:

an image capturing device for capturing the image of a real object;

second imaging means connected to said image capturing device for providing a second composite video signal representative of said captured image to be analyzed;

means for converting said second composite video signal into second red, blue and green gun-control signals;

second control means for selectively passing one of said second gun-control signals to one of said color guns of said display devices; and means for changing the intensity of said second gun-control signal that is passed to said color display devices.

7. A diagnostic imaging system comprising:

video means for providing a monochrome video signal representative of an image to be analyzed;

means for converting said monochrome video signal into a plurality of gun-control signals;

control means selectively operable in first and second modes, said control means in said first mode for passing said gun-control signals to said color video display means and for displaying said image through activation of less than all of said primary color guns and said control means in said second mode for passing said gun-control signals to said color video display means and for displaying said image through activation of all of said primary color guns; and means for changing the intensity of said gun-control signals that are passed to said color video display means.

8. The imaging system of claim 7, wherein said video means comprises:

a microscope including a specimen holding area and a light source for illuminating the specimen holding area;

imaging means for providing said monochrome video signal representative of an image of a specimen to be analyzed; and means for interfacing said microscope with said imaging means so that said image of the specimen is converted into said monochrome video signal in said imaging means.

9. The imaging system of claim 7, wherein said video means comprises:

an X-ray image display device including an X-ray film holding area and a light source for illuminating the X-ray film holding area;

imaging means for providing said monochrome video signal representative of an image of an X-ray film to be analyzed; and means for interfacing said X-ray film with said imaging means so that said image of the X-ray film placed in said X-ray film holding area is converted into said monochrome video signal in said imaging means.

* * * * *